United States Patent Office 2,722,881
Patented Nov. 8, 1955

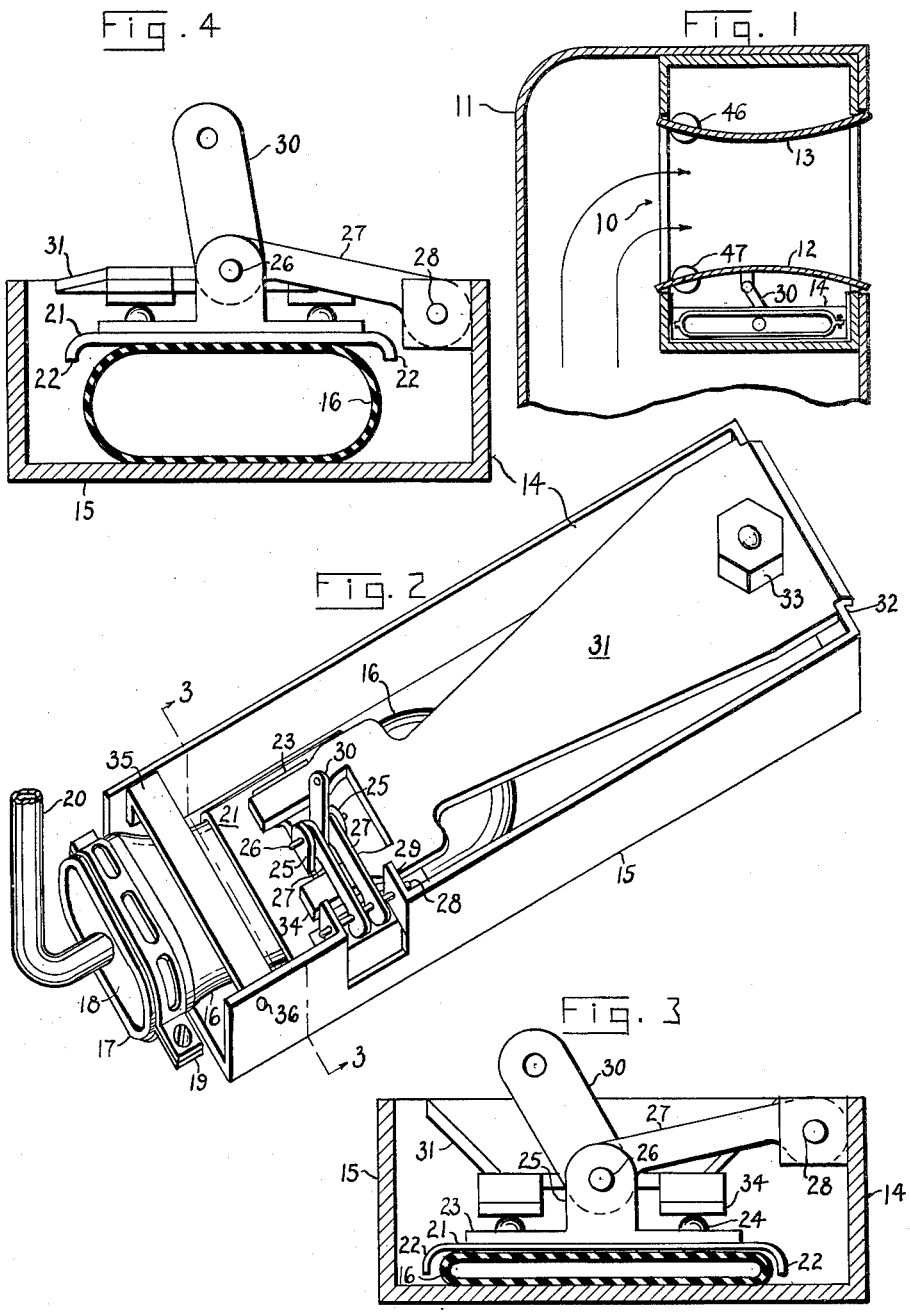

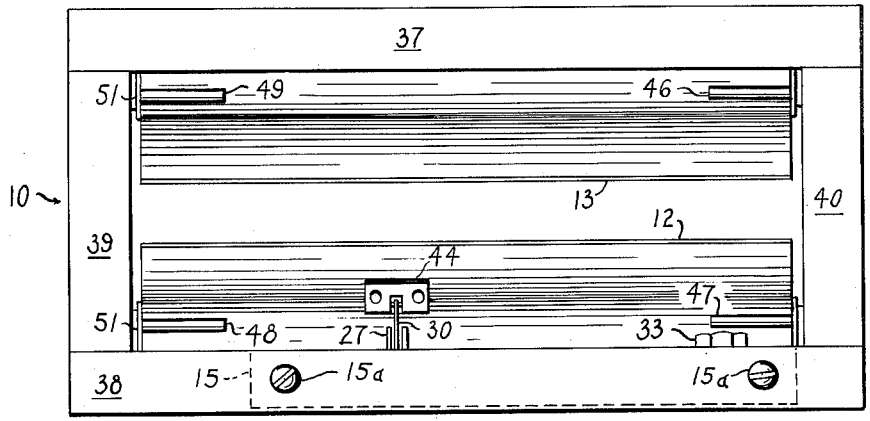

2,722,881

DAMPER CONTROL

Noel H. Sutterfield, Columbus, Ohio, and Arpad Elo, Milwaukee, Wis., assignors, by mesne assignments, to General Controls Co., a corporation of California Application February 23, 1950, Serial No. 145,619

4 Claims. (Cl. 98—41)

The present invention relates to a novel means for controlling the flow of conditioned air or other fluid. Essentially it utilizes an expansible means to transform pressure changes within the expansible means into mechanical movement of a damper blade or blades.

Damper assemblies of the type herein referred to find their principal use in varying the flow of conditioned air into a room or enclosure. They may, of course, be utilized wherever it is necessary to control the flow of fluid from one location to another. As utilized in the air conditioning art, such dampers are customarily located at the outlet of a duct for passing conditioned air into a room or other enclosure. An actuator which may be of various types, such as an electric motor or pneumatic motor serves to move the damper blades or blade between open and closed positions. In the air conditioning art it is highly desirable that the damper assembly, including the actuator, be a compact unitary structure easily installed at the duct outlet. Since damper assemblies of this type are customarily installed with their front face flush with a wall of the room or enclosure into which conditioned air is to be introduced, any extension of the actuator or other portion of the damper assembly into the room is objectionable from an aesthetic viewpoint and also in that the extending portion is vulnerable to damage in movement of furniture or other large objects within the room.

In transmitting the effort furnished by the actuator to the damper blades it is desirable that some means be provided for increasing the effective moment arm of the thrust provided by the actuator as the damper blades or blade approach closed position, since the air passing through the damper then exerts an increasing force on the damper blades resisting their movement toward closed position.

A commercially feasible damper assembly of the type described above must combine the damper blades, the actuator, and the linkage mechanism all in a relatively compact structure and yet be rugged and dependable in operation.

An object of this invention is to provide a damper assembly fulfilling these requirements.

A further object is to provide a damper assembly wherein a compact arrangement of parts, including the actuator is made possible by locating the actuator within the damper frame adjacent a flanged portion thereof.

A further object is to provide a damper assembly having none of its components extending into the room or enclosure into which conditioned air is to be introduced.

A further object is to provide a damper assembly in which the thrust exerted by the actuator has an increasing effective moment arm as the damper blades or blade approach closed position.

A further object is to provide a damper assembly utilizing a pressure actuator which includes an expansible means and a floating plate and linkage associated therewith for positively positioning the damper blade or blades.

Another object of this invention is to provide a unitary device capable of easy and accurate adjustment.

Other objects will become apparent as this description proceeds and are illustrated in the appended claims.

In the accompanying drawings:

Fig. 1 shows a cross-sectional view of the damper assembly mounted at the discharge end of a duct for delivering conditioned air to a room or enclosure.

Fig. 2 is a perspective view showing the actuator separate from the damper unit.

Fig. 3 is an enlarged cross-sectional view of the actuator taken along the lines 3—3 of Fig. 2 showing in detail the linkage and construction.

Fig. 4 is an enlarged cross-sectional view of the actuator taken along the lines 3—3 of Fig. 2, but showing the actuator in inflated position.

Fig. 5 is a front view of the damper assembly with the damper blades shown in half open position.

Fig. 6 is a rear view of the damper assembly shown in Fig. 5 with a portion of the cover plate broken away to show the damper linkage.

Fig. 7 is an end view of the damper assembly shown with the end plate removed and illustrating the linkage between the damper blades.

Fig. 8 is a front view of the adjusting clamps shown in Fig. 7.

In the following description like reference characters indicate like parts in the various views.

In Fig. 1, a damper assembly indicated generally at 10 controls the passage of conditioned air from duct 11 which is disposed in the usual way between studs in a wall of a room or enclosure. The air obstructing means may take the form of a single damper blade or a plurality of blades but in the embodiment illustrated it comprises the damper blades 12 and 13 which are pivotally mounted in the damper assembly to move between open and closed positions. The damper blades 12 and 13 may be of any suitable shape or curvature but in the embodiment illustrated they are of the air volume type and are convexly curved with relation to the path of air flow to produce a substantially stream-lined flow of air through the damper at any position of the blades beyond closed position.

In Figs. 2 and 3 the actuator 14 is shown in contracted or deflated position, separately from the damper. A suitable pan shaped casing or mounting member 15 is provided for the various parts and it will be seen that an expansible means illustrated as an expansible container or bag 16 is disposed where it may have the confining support of the bottom and side walls of the casing. The container or bag 16 may be formed of any suitable flexible material and in the embodiment illustrated is formed of a molded rubberlike material shaped in the form of a flat capsule with a wide mouth 17 into which an oval plug 18 is tightly inserted. A fluid seal is maintained between the bag mouth and the plug by means of clamp 19, the lower half of which is formed integrally from the bottom of the casing 15 whereby to position the bag positively with respect to the casing. It will be noted that the bag 16 forms an expansible member which because of its flexibility is capable of changing its volume upon changes in its internal pressure.

A tube 20 extends to the plug from any suitable source of fluid under variable pressure (not shown) and is in fluid communication with the inflatable bag through a hole in the plug, so that fluid supply to the bag will inflate it and release of fluid pressure in the tube will permit the bag 16 to collapse.

Overlying the bag 16 is a pressure member or plate 21 made preferably of sheet metal or material of similar stiff characteristics. This pressure plate floatably rests atop the bag and has downwardly turned margins 22 which confine the bag and serve to restrain the bag from ballooning around the side edges of the plate.

Also overlying the bag, between the portions of the bag bearing against the plate 21 and the clamp 19 is a guard means 35 which is secured to the casing by rivets 36 (one of which is shown) and is spaced from the bag until the bag is expanded.

Attached centrally to the plate 21 is a pad 23 with upturned ears 25 and a pivot pin 26 extending between the ears. Upon this pin 26 are mounted means for positioning the plate 21 in its floating operations incident to bag inflation and deflation and, also, means for operatively connecting the pad to the damper blades. At either side of the pad 23 is a somewhat hemispherical bump 24 serving as a bearing for a loading spring to be described below.

Loosely mounted on pin 26 are positioning members or links 27 which are loosely mounted also upon pin 28 extending between two inturned ears 29 integral with casing 15. Thus, as the plate 21 and pad 23 rise and fall with the action of the bag 16 they are permitted a limited lateral floating movement. Also mounted on pin 26 is a link 30 which, in the embodiment shown, connects the actuator to the lower damper blade 13 (see Fig. 4).

Also partially overlying the bag and acting as a loading spring is a resilient means which may take the form of a spring blade 31. One end of the blade 31 is shaped to rest over the margin 32 of the end of casing 15. The other end is bifurcated to provide extensions 34 which bear downwardly upon bearing bumps 24. Between the ends of the spring 31, preferably near the margin 32 of the casing 15, an adjusting means comprising a screw and nut 33 connect the spring to the bottom of the casing and provide for adjustable tensioning of the loading spring against the upward pressure of the bag 16 and plate 21.

It will be apparent that the actuator provides means for actuating the damper blades in response to variations in pressure within the bag 16. As pressure increases within the bag the loading spring 31 is flexed and the plate moves upwardly under lateral control of links 27, see Fig. 4. As the plate 21, pad 23 and actuator link 30 are forced away from the bottom of the casing 15, the damper blades are moved toward their closed position through a linkage means to be subsequently described.

Reference is now made to Figs. 5, 6 and 7, wherein is shown the complete damper assembly 10. The damper assembly 10 comprises a frame of rectangular configuration formed of a top channel 37, a corresponding bottom channel 38, a left side channel 39, and a right side channel 40, secured together by spot welding to form a rectangular casing. The damper blades 12 and 13 are shown in their half-open position for purposes of better illustration. The bottom channel 38 forms a receptacle for the actuator 14 which is fastened thereto by any suitable means, such as screws 15a. The channel 38 is provided with a hole for reception of the tube 20. It will be noted that the channels 37, 38, 39 and 40 form a frame having marginal inturned flanges which with the web portion of the channels form a compartment within the damper frame for mounting the actuator 14 and the linkage (to be described) for transmitting motion between the damper blades. This construction makes possible a compact damper assembly the outer face of which may be mounted flush with the wall of an enclosure with no components of the assembly extending forwardly into the enclosure or rearwardly into the air duct.

As seen in Fig. 6, the rear view of the damper assembly, two air stops 41 and 42 are fastened to the top and bottom channels 37 and 38 respectively by means of metal screws 43. These air stops prevent the flow of air around the outside of damper blades 12 and 13 thereby directing the air flow between the damper blades.

The actuator link 30 is connected through an apertured bracket 44 to the upper side of the lower damper blade 12 and pivotally secured by means of a pin 45. The damper blades 12 and 13 are pivotally mounted to the damper frame by means of shafts 46, 47, 48 and 49, fastened to the blades by screws 50. The shafts extend through bearings 51 secured to the side channels 39 and 40. Referring to Fig. 6 the left side channel 40 merely supports the shafts 46 and 47 but the right side channel 39 contains the linkage assembly connecting the upper and lower damper blades.

As seen in Figs. 6 and 7 the shaft 48 extends thru the bearing 51 and channel 39 into a plate 53 and freely through a moveable member 52. The shaft 48 has a grooved and flattened end which allows a snap ring 54 to retain the plate 53 and the member 52 upon the shaft 48. The plate 53 (Fig. 7) has a slotted portion 55 which is adjustably secured to the member 52 by means of a screw 56. The flattened end of shaft 48 fits in a slotted portion 75 of the plate 53 (Fig. 8). This makes the shaft 48 and the plate 53 unitary in movement while the member 52 and the shaft 48 are capable of relative pivotal movement. Because the adjusting screw 56 secures member 52 and plate 53 together, they move in unison with movement of the shaft 48. It will be understood that the plate 53 might be formed integrally with the damper blade 12 and not supported on the shaft 48 as illustrated, the essential requirement being that it be positionally fixed with relation to the blade 12. The screw 56 and slot 55 provide a means of adjusting the fixed positional relation of the moveable member 52 with relation to the plate 53 and consequently with relation to the damper blade 12. Secured to the member 52 by pivot pin 57 and snap ring 58 is a link 59. The link 59 is pivotally secured to a rocking member or crank arm 60 by means of a pivot pin 61 and snap ring 62. The crank arm 60 is pivotally mounted intermediate its ends on the side channel 39 by means of a shaft 63, washer 64 and snap ring 65. The crank arm 60 is also pivotally fastened to a link 66 by means of pivot pin 67 and snap ring 68. It will be noted that the pivotal connections of the links 59 and 66 are on opposite sides of the pivotal mounting of the crank arm 60. The upper end of link 66 is fastened to a moveable member 69 by means of a pivot pin 70 and snap ring 71. The member 69 is fastened to a plate 72 by means of screw 73, the member 69 and the plate 72 are also supported on the shaft 49 and retained thereon by means of a snap ring 74. Note that these parts correspond to like parts on shaft 48.

In operation, as a result of movement of the actuator 14 and corresponding movement of link 30, the upward movement of lower blade 12 causes a counter-clockwise rotation of shaft 48 (Fig. 7) and consequently counter-clockwise rotation of plate 53 and member 52. The member 52 will cause the link 59 to move upwardly rotating the crank arm 60 counter-clockwise about the shaft 63. The rotational movement of crank arm 60 causes the link 66 to move downwardly. This downward movement of link 66 moves the member 69 and plate 72 in a clockwise direction causing the shaft 49 to pivot clockwise. The upper damper blade 13 being rigidly fastened to the shaft 49 is thus pivoted clockwise upon the counter-clockwise movement of blade 12 and vice versa upon movement of link 30 downwardly.

As previously pointed out, as the blades 12 and 13 approach their closed positions, the air passing through the damper assembly exerts an increasing force opposing such closing movement. It will be noted that as the damper blades approach their closed positions the rocking member 60 approaches a position wherein its longitudinal axis is normal to the longitudinal axes of links 59 and 66. Because of this arrangement the turning moment imparted to the member 60 approaches a maximum as the damper blades approach their closed position.

The invention herein described has its principal use in controlling the flow of conditioned air into a room or enclosure, but it will be apparent that certain features of the invention may be utilized in generally controlling the flow of fluids other than conditioned air for purposes

What is claimed is:

1. An actuator, a member moveable by said actuator, said actuator including a casing having upturned margins one of which is provided with an anchorage, an expansible bag provided with fluid connections and receivable in the casing, a plate receivable on the bag provided with connections to the anchorage and to said member, a loading spring extending from one of said margins to the plate with an adjusting member between the casing and the spring for adjusting pressure on the plate, said spring and plate overlying the bag in position to prevent ballooning of the bag.

2. A damper assembly for controlling fluid flow into an enclosure comprising a frame; a damper vane pivotally mounted within said frame; an actuator casing mounted within said frame and containing an actuator for moving said vane; said actuator comprising, an expansible bag provided with fluid connections and mounted within the base of said casing, a plate overlying said bag and movable in response to pressure variations therein, said plate having a first pivotal connecting link pivotally mounted on said casing and a second pivotal connecting link connected to said vane, a spring blade overlying said bag having one end secured to said casing and its free end bearing against said plate, and adjustable means for varying the tension exerted by said spring blade.

3. A damper assembly for controlling fluid flow into an enclosure comprising a frame; a damper vane pivotally mounted within said frame; an elongated relatively flat actuator casing mounted within said frame and containing an actuator for moving said vane; said actuator comprising, an elongated flexible container positioned lengthwise on said casing, said container connected to a source of fluid pressure whereby an increase in pressure will result in an increase in volume of said container and a decrease in pressure will result in a decrease in volume of said container, a plate overlying a portion of said container and movable normal to the plane of said casing upon volumetric changes in said container, actuating means secured to said plate and to said vane, a link having a pivotal connection at one of its ends to said casing and a pivotal connection at its other end to said plate, said link substantially restricting motion of said plate in any direction other than normal to the plane of said casing base, resilient means mounted on said casing and exerting a force on said container which tends to reduce the volume thereof, and means for adjusting the force exerted by said resilient means.

4. A damper assembly for controlling fluid flow into an enclosure comprising a frame; a plurality of damper vanes pivotally mounted within said frame; an elongated relatively flat actuator casing mounted within said frame and containing an actuator for moving said vanes, said actuator comprising, an elongated flexible container positioned lengthwise on said casing, said container connected to a source of fluid pressure whereby an increase in pressure will result in an increase in volume of said container and a decrease in pressure will result in a decrease in volume of said container, a plate overlying a portion of said container and movable normal to the plane of said casing upon volumetric changes in said container, actuating means secured to said plate and to said vane, a link having a pivotal connection at one of its ends to said casing and a pivotal connection at its other end to said plate, said link substantially restricting motion of said plate in any direction other than normal to the plane of said casing base, resilient means mounted on said casing and exerting a force on said container which tends to reduce the volume thereof, and means for adjusting the force exerted by said resilient member.

References Cited in the file of this patent

UNITED STATES PATENTS

| Number | Name | Date |
| --- | --- | --- |
| 671,593 | Harper | Apr. 9, 1901 |
| 1,848,053 | Bacon | Mar. 1, 1932 |
| 2,161,743 | Heinrich et al. | June 6, 1939 |
| 2,258,664 | Treshow | Oct. 14, 1941 |
| 2,281,615 | Peple, Jr. | May 5, 1942 |
| 2,331,758 | Barnett | Oct. 12, 1943 |
| 2,365,320 | Young | Dec. 19, 1944 |
| 2,372,273 | Hermanson | Mar. 27, 1945 |
| 2,400,044 | Hermanson | May 7, 1946 |
| 2,407,284 | Kennedy | Sept. 10, 1946 |